(No Model.) 3 Sheets—Sheet 1.
R. McFARLANE.
WEIGHING AND RECORDING SCALE.
No. 483,675. Patented Oct. 4, 1892.
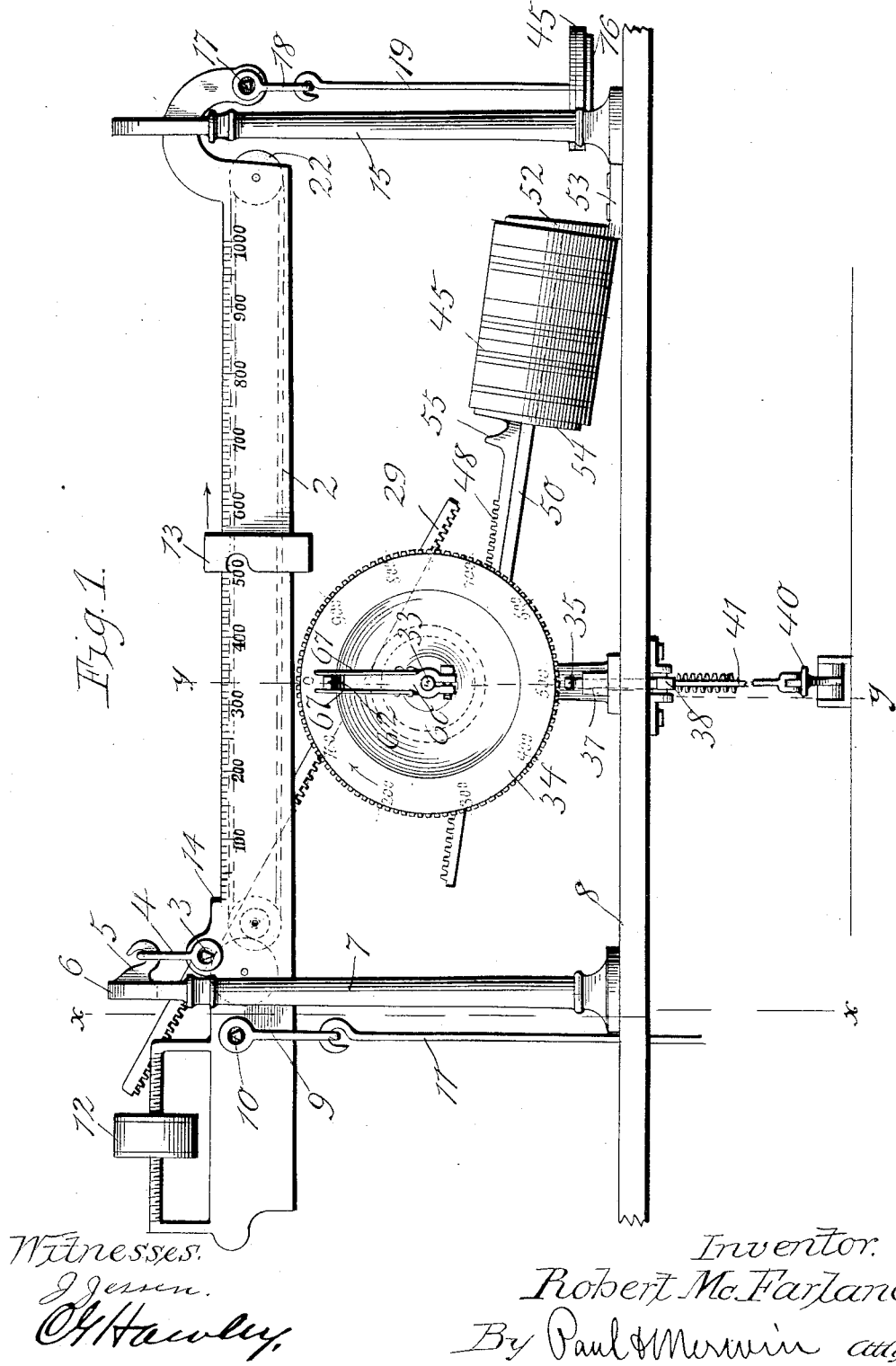
Witnesses.
J Jensen
OH Hawley
Inventor.
Robert McFarlane
By Paul H Merwin Atty's

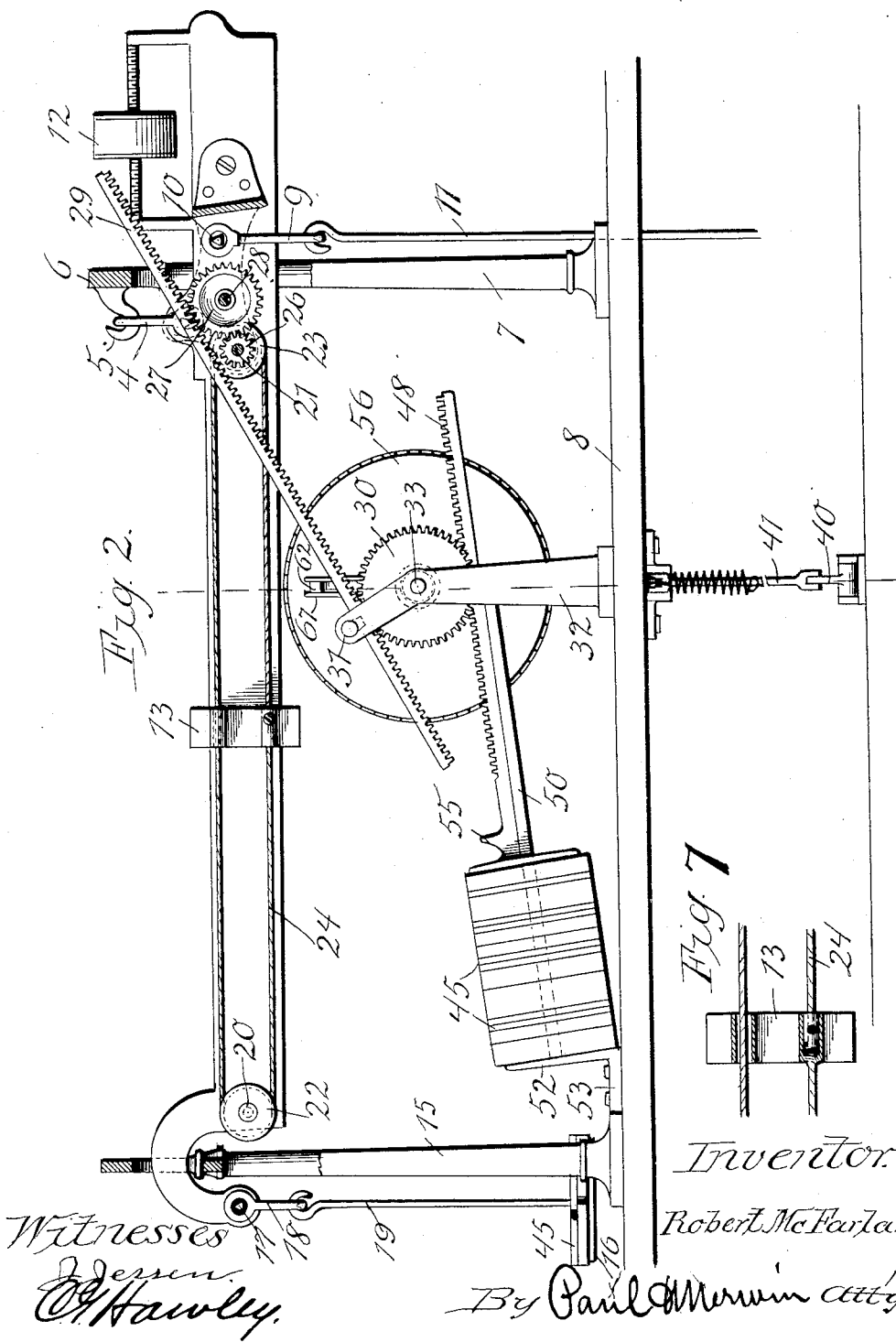

(No Model.) 3 Sheets—Sheet 3.

R. McFARLANE.
WEIGHING AND RECORDING SCALE.

No. 483,675. Patented Oct. 4, 1892.

Witnesses:
J. Jensen.
O. F. Hawley.

Inventor:
Robert McFarlane
By Paul & Memmen attys.

UNITED STATES PATENT OFFICE.

ROBERT McFARLANE, OF MINNEAPOLIS, MINNESOTA, ASSIGNOR OF ONE-HALF TO WALDO E. HOLMES, OF SAME PLACE.

WEIGHING AND RECORDING SCALE.

SPECIFICATION forming part of Letters Patent No. 483,675, dated October 4, 1892.

Application filed November 7, 1891. Serial No. 411,136. (No model.)

*To all whom it may concern:*

Be it known that I, ROBERT MCFARLANE, of Minneapolis, in the county of Hennepin and State of Minnesota, have invented certain Improvements in Weighing-Scale Recorders, of which the following is a specification.

My invention relates to means whereby the various and succeeding weights indicated by the scale may be readily and accurately recorded upon a paper or card, upon which after all of the weighing has been done the total may be figured up; and its object is to provide a scale-recorder of a semi-automatic character which will require but the attention of one person, with which weighing may be done very rapidly and still be accurately recorded, and, further, a device of great accuracy, durability, and cheapness.

To this end my invention consists in the combination, with the scale-beam, of the sliding poise thereon, a belt or cord adapted to rotate on sheaves arranged one at each end of the scale-beam and having one of its sides secured upon the back of the poise, a gear in connection with the sheave provided near the pivot point, a rack engaging said gear, and a recording wheel or disk provided with figures upon its periphery and adapted to be operated by the movement of said rack, means being provided for taking from the roll at a fixed point the figure or figures indicating the weight upon the scale-platform in a second sliding rack arranged to operate another disk or wheel and having a lower end or head adapted to engage the end of the row of counterpoise weights stored on the frame provided for the same, whereby, all of the weights being upon the frame, the lower or secondary rack will stand so that the recording-wheel connected therewith will indicate zero, while as the several counterpoise-weights are removed from the weight-frame and the rack moved down said wheel will be turned to indicate the unit numbers—as, for instance, "1,000," "2,000," "3,000," "4,000," &c.

My scale is ordinarily employed in weighing heavy weights, such as grain, coal, ores, &c., of which large quantities must be weighed at once; but it is obvious that my device might be embodied in small sizes.

My invention will be more readily understood by reference to the accompanying drawings, in which—

Figure 4:
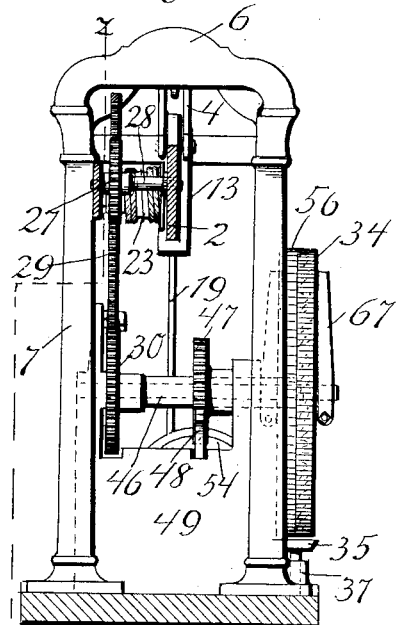
Figure 3:
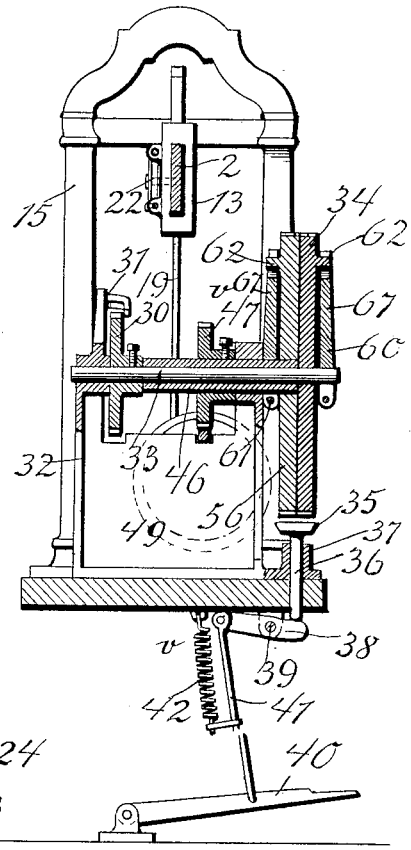
Figure 5:
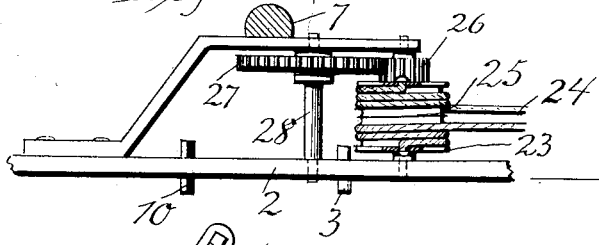
Figure 6:
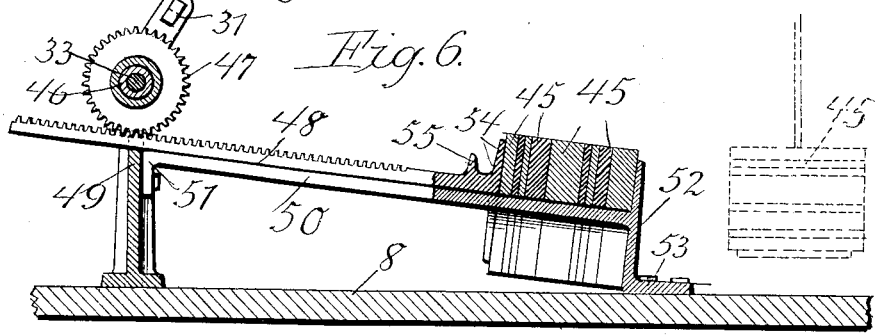

Figure 1 is a front view showing a device embodying my invention. Fig. 2 is a rear elevation thereof. Fig. 3 is a cross-section on the line *y y* of Fig. 1. Fig. 4 is a similar cross-section on the line *x x* of Fig. 1, and the line *z z* thereon shows the section whereon Fig. 2 is taken. Fig. 5 is an enlarged detail view showing the arrangement of the sheave and gear on the back of the scale-beam. Fig. 6 is a sectional detail showing the detachable counterpoise-weights on the fixed bar or frame-rest and also the sliding toothed rack. Fig. 7 is a section of the running poise.

In the drawings, 2 represents the scale-beam, which is hung on the knife-edges 3, resting within the loops of the U-link 4, swung in the hook 5, provided centrally on the arch 6 of the main frame 7, which in turn rests upon the solid base 8. The pull is exerted on the scale-beam through the U-link 9, hung on the knife-edges 10 of the rear end of the bar 2 and engaging the upper end of the draw-bar 11. On the rear end of the scale-beam is the usual adjustable counter-weight 12. When the poise 13 stands against the shoulder 14 on the upper edge of the bar, the scale is exactly balanced. The forward end of the beam is of the usual form, being confined to a small vertical movement by the frame 15. The main weight-carrier 16 is hung from the knife-edges 17 on the end of the beam by means of the link 18 and the rod 19, all of the ordinary construction.

Now, referring to Fig. 2, it will be seen that on the back of the scale-beam I arrange loosely upon short thick studs 20 and 21 the sheaves 22 and 23, which are grooved to receive the endless cord, belt, or flexible wire 24, one end of which is wound around the sheave 23 several times, as shown plainly in Figs. 4 and 5, this sheave being provided with a spiral groove 25, as there shown. The cord is thus compelled to wind regularly upon the sheave 23. The other sheave has only a single groove. To one side—namely, the lower side—of the cord 24 I fasten by means of a screw or screws or other convenient clamp the poise 13. The other side of the cord or loop is loose. Hence as the weight is pushed along the beam the sheaves 22 and 23 are revolved. Now, in connection with the sheave 23 and to move therewith I provide the pinion 26, which in turn meshes with the idler 27, loosely fixed on the stud 28 and meshing with the long inclined rack-bar 29 at a point exactly coincident with the knife-edge bearings 3. Owing to this arrangement the beam is in no way influenced by the weight of the rack-bar, and, further, as this point never moves the rack-bar 29 always stands at the same incline. As the weight 13 is adjusted the rack-bar 29 will be moved up or down, thereby operating the gear-wheel 30, in contact with which the rack-bar 29 is held by the lugged arm 31, formed upon one of the standards 32.

Referring to Fig. 3, it will be seen that the gear-wheel 30 is fastened upon the shaft 33, to which I secure a recording wheel or disk 34 by means hereinafter particularly described. Hence, the sliding weight 13 having been finally adjusted, this recording-wheel will have turned so as to carry a figure or figures corresponding to the figure indicated on the beam into position to be engaged by the stamp foot or plate 35. The head 35 has a pliable rubber face, and the shank 36 thereof extends down through the guiding-sleeve 37, fixed on the base, and engages the end of the lever 38, pivoted at 39 and connected with the foot-lever 40 by the rod 41. The coiled springs 42 or other convenient means are provided for returning the lever after depression. A paper or card being placed between the plate 35 and the bottom of the indicating-roll the figures thereon will be stamped or embossed upon the paper when the foot-lever is depressed. The face or periphery of the rolls may be inked, if desired; but ordinarily the figures on the disk are of raised steel figures, which emboss the paper heavily and may be easily read.

The weights which are indicated on the scale-beam and the recording-wheel 34 thereof are the fractional weights of the fixed unit, which unit in the scale shown in the drawings is one thousand pounds. Hence figures from "0" to "1,000" are arranged on the wheel 34. As, however, it is seldom necessary in such a sized scale to weigh less than ten pounds, the raised figures upon the wheel increase by tens, thus reducing the number of the same on the periphery to one hundred and one.

For indicating the units, or, in other words, weights of over one thousand pounds, I arrange another recording-wheel dependent for its positions upon the presence or absence of the removable counterpoise-weights 45 upon the fixed bar or frame which is adapted to receive the same for storage. This part of the device is in no way connected with the beam 2. On the shaft 33 I provide the loose sleeve or bush 46, on which I arrange the gear 47, which meshes with the second rack-bar 48, arranged beneath it and supported and guided by the notched wall or plate 49 and the upper end of the weight bar or rod 50. One end 51 is secured to the plate 49 and the other end formed with the bracket 52, secured by bolts 53 to the base 8. The counterpoise-weights 45 are slotted, as usual, so that they may be placed upon the weight hung from the end of the scale-beam. When not in use upon the counterpoise, these plates 45 are stored on the rod 50, and their width is exactly proportional one to the other with their weights in pounds or ounces. The lower end of the rack-bar 48 is provided with the plate 54, adapted to engage the upper end of the row of weights 45. 55 is a finger-lug provided on the top of the bar, so that it may be easily moved by the finger of the operator. To the sleeve 46 I secure the second recording-wheel 56, numbered "0, 1, 2, 3, 4," and so on upward. Each number represents a certain combination of the different-sized counterpoise-weights 45 when placed upon the weight carrier. Now suppose a balance to have been struck with all of the parts in the position shown in Fig. 1, the two plates 45 on the counterpoise together indicating two thousand pounds. The operator pushes down the rack 48, and thereby turns the recording-wheel 56, which is stopped with a figure opposite to the plate 35, the head 54 of the rack having at that instant engaged the upper end of the row of weights 45 on the rod 50, the balance of the beam having meantime been arranged by moving the sliding poise 13 to the "500" mark on the beam 2. The operator now depressing the lever 40, he will imprint upon his record card or sheet the sum-total—"2,500." If, as in Fig. 6, a larger number of weights are removed from the bar 50, many more thousand pounds would be indicated by the recording-wheel. Owing to the necessary weight of some of the parts, and especially the recording-wheels, I provide means whereby the bad effects of their momentum upon the several parts of the machine are obviated. This consists in a spring connection for each recording-wheel with its shaft or sleeve, the same being shown in Figs. 1 to 4. The arms 60 and 61 are clamped upon the shaft 33 and the sleeve 46, respectively. On each wheel I provide a lug or pin 62, and to engage the same two springs 67, one on each side of each arm 60 or 61. The pins 62 are held between the ends of these springs. Hence it will be seen as the disk throws around faster than the shaft or the sleeve the force thereof will be taken up by one of the springs 67, thereby preventing permanent change of position of one on the other. The arms 60 are carried to the upper parts of the springs, so that the spring on one side of an arm may be stronger than that on the other without influencing the disk where the pin is arranged.

Having thus described my invention, I claim as new, and desire to secure by Letters Patent—

1. The combination, with a scale-beam and means for applying weight thereto, of a sliding poise arranged on the beam, a cord fixed to said poise, the inner portion of the cord, belt, or wire arranged upon a pulley fixed on the inner end of the scale-beam, a shaft arranged at a point removed from the scale-beam, a recording-wheel thereon, and means for operating the same from said cord, substantially as described.

2. The combination, with the scale-beam, of the frame wherein the same is pivoted, a poise on said beam, pulleys arranged on the ends of the beam, an endless cord, belt, or wire provided thereon, a separately and independently arranged recording device, and a connection between the same and the innermost of said pulleys, substantially as and for the purpose specified.

3. The combination, with the pivoted scale-beam, of sheaves arranged at the ends thereof, a poise, a cord or belt or wire arranged on said sheaves or pulleys, said cord connected with said sliding weight, a gear in connection with the innermost pulley, a rack engaging the same, and a recording device to be operated by the movement of said rack, substantially as described.

4. The combination, with the pivoted scale-beam and means for applying weight thereto, of sheaves or pulleys arranged on said beams, an endless cord passing over and between the same, a poise arranged upon the beam and engaging said cord, wire, or belt, a gear arranged in connection with the innermost pulley, a rack meshing therewith to be operated thereby, a recording or registering wheel, a gear-wheel to move therewith, said rack engaging the same, figures or characters arranged on said wheel, and means for taking impressions therefrom, substantially as described.

5. The combination of the scale-beam and the weight-carrier thereof with detachable counterpoise-weights, a frame or bar whereon the same are stored when not in use on said carrier, a recording-wheel, a slidable head to engage the end of the row of stored weights, and means in connection therewith for operating the recording-wheel, substantially as described.

6. The combination, with the beam and the weight-carrier swung from the end thereof, of detachable weights adapted to be placed thereon, a bar or frame for storing said weights when not in use, a rack having an end adapted to engage the end of the row of stored weights, a recording-wheel, and a gear arranged in connection therewith to engage said rack, whereby on the movement of the rack the wheel is operated, means being provided in connection with said wheel for permanently recording the weights indicated thereby, substantially as described.

7. The combination, with the beam pivotally supported in a suitable frame, of a weight-carrier therefor, detachable counterpoise-weights, a stationary bar or frame therefor, a movable rack having an end to engage the same when on said frame, a recording-wheel supported upon a suitable shaft, and a gear-wheel arranged in connection therewith and meshing with said movable rack, said rack provided with the end 54 and the finger-lug 55, substantially as described.

8. The combination of the pivoted scale-beam, the poise slidable thereon, and the weight-carrier with separable counterpoise-weights therefor, a fixed frame adapted to receive said weights when not in use, a rack longitudinally slidable with respect to the row of weights thus stored, the head or end of said rack adapted to engage the foremost counterpoise-weight on the frame, a recording-wheel having figures indicating units and adapted to be operated by the movement of said rack, sheaves or pulleys arranged at the ends of said beam, a cord or belt or wire arranged upon the same and fixed on the poise and rack, a gear interposed between the same and the innermost sheave or pulley, a second recording-wheel arranged to be operated by the movement of said second rack, said second wheel provided with figures to indicate fractions of a unit, and means for simultaneously printing from said wheels to record the total weight, substantially as described.

9. The combination, with the beam and the weight-carrier hung therefrom, of separable counterpoise-weights, a stationary frame or bar whereon the same are adapted to be stored, a rack having a head or end to engage the end of the row of weights, a recording-wheel adapted to be operated by the movement of said rack, sheaves on the beam, a cord or belt or wire passing over and between the same, the beam-poise arranged on the beam and fixed to the cord, a second recording-wheel, and a rack adapted to operate the same and to be operated by the movement of said slidable weight communicated through said cord, belt, or wire, substantially as described.

10. The combination of the pivoted scale-beam, the sliding poise, and the weight-carrier with an endless cord or belt or wire arranged in connection with said beam and poise, a rack to be operated by said cord, wire, or belt, and gear operated thereby, a shaft, a recording-wheel yieldingly fixed on the same, a gear provided on said shaft and meshing with the lower part of said rack, means for holding said rack thereon, a stationary frame or rod, the counterpoise-weights to be stored thereon, another rack slidably arranged with respect to the same, a second recording-wheel arranged on a sleeve loosely provided on said shaft and having a gear to engage the second rack, said second wheel yieldingly fixed on said sleeve, and a printing-plate movably arranged with respect to said recording-wheels, and means for forcing the same against the peripheries thereof, substantially as described.

11. The combination, with the beam 2, of the frame whereon the same is pivoted, the sheaves 22 and 23, arranged on opposite ends of the beam, the endless cord 24, passing over the same, the poise 13, arranged on the beam and whereto one side of the cord is fixed, the gear-wheel 26 to move therewith, a gear 27, meshing therewith, the rack-bar 29, engaging the same, the gear 30, arranged on the shaft journaled in standards, the lugged arm 31, guiding said bar 29, and the recording-wheel to be operated by the movement of the rack 29, substantially as described.

12. The combination, with a weighing-scale, of a recording wheel or wheels adapted to be operated in connection therewith, a printing-plate 35, provided on the stem 36, the pivoted lever 38, the treadle 40, linked thereto, and a spring for raising the same, substantially as described.

13. The combination, with the standards, of the shaft with a recording-wheel arranged thereon, an arm clamped thereon, springs arranged on the sides of said arms, and a pin on said wheel or disk and engaged by said spring, substantially as described.

14. The combination, with the beam 2 and the poise thereof, of the grooved pulleys or sheaves 22 and 23, arranged on said beam, the pulley 23, arranged on the inner portion of the beam, being provided with a spiral groove 25, an endless cord, belt, or chain wound about said sheave and extending over the sheave 22, and a recording device to be operated from the sheave 23, substantially as described.

In testimony whereof I have hereunto set my hand this 4th day of November, 1891.

ROBERT McFARLANE.

In presence of—
C. G. HAWLEY,
WALDO E. HOLMES.